(12) United States Patent
Goldfarb

(10) Patent No.: US 8,532,668 B2
(45) Date of Patent: Sep. 10, 2013

(54) SYSTEM AND METHOD FOR TARGET LOCATION PROFILING

(75) Inventor: Eithan Goldfarb, Ness Ziona (IL)

(73) Assignee: Verint Americas, Inc., Alpharetta, GA (US)

( * ) Notice: Subject to any disclaimer, the term of this patent is extended or adjusted under 35 U.S.C. 154(b) by 693 days.

(21) Appl. No.: 12/628,089

(22) Filed: Nov. 30, 2009

(65) Prior Publication Data

US 2010/0137003 A1 Jun. 3, 2010

(30) Foreign Application Priority Data

Dec. 2, 2008 (IL) .......................................... 195662

(51) Int. Cl.
*H04W 24/00* (2009.01)
(52) U.S. Cl.
USPC ..... 455/456.1; 455/423; 455/446; 455/456.3; 455/456.5; 455/67.11
(58) Field of Classification Search
USPC ................ 455/456.1, 412.1, 423, 446, 67.11, 455/456.3, 456.5; 701/117, 301, 26; 379/209.01, 88.02, 265.01
See application file for complete search history.

(56) References Cited

U.S. PATENT DOCUMENTS

| | | | |
|---|---|---|---|
| 2003/0117320 A1 | 6/2003 | Kim | |
| 2008/0026769 A1* | 1/2008 | Braam | ....................... 455/456.1 |
| 2008/0026771 A1 | 1/2008 | Hill | |
| 2009/0201149 A1 | 8/2009 | Kaji | |

FOREIGN PATENT DOCUMENTS

| | | |
|---|---|---|
| EP | 1379098 | 1/2004 |
| GB | 2402841 | 12/2004 |
| GB | 2434504 | 7/2007 |
| JP | 2007204936 | * 2/1997 |
| WO | WO2004054304 | 6/2004 |
| WO | WO2005/057954 | * 6/2005 |
| WO | WO2008037638 | 4/2008 |
| WO | 2010116292 A2 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — Manpreet Matharu
(74) *Attorney, Agent, or Firm* — Meunier Carlin & Curfman

(57) ABSTRACT

Methods and systems for profiling the locations of users of wireless communication terminals. A profiling engine may accept data points regarding a given target. Each data point may indicate a location of the target at a certain measurement time. The profiling engine may accumulate the data points relative to a periodic time scale having a pre-specified time period. The accumulation process produces a location profile of the target. The location profile may convey information regarding the tracked targets. For example, the profiling engine may use the location profile to improve the location accuracy of a target terminal that is idle for long period of time, to detect deviations from the characteristic location pattern of a target, to detect that a certain sensitive location is being visited regularly by a given target, and/or to identify connections among different targets by detecting similarities or correlations between their location profiles.

14 Claims, 4 Drawing Sheets

US 8,532,668 B2

SYSTEM AND METHOD FOR TARGET LOCATION PROFILING

FIELD OF THE DISCLOSURE

The present disclosure relates generally to location tracking, and particularly to methods and systems for profiling the locations of users of wireless communication terminals.

BACKGROUND OF THE DISCLOSURE

Mobile communication networks deploy various techniques for measuring the geographical locations of wireless communication terminals. Such techniques are used, for example, for surveillance purposes and for providing Location Based Services (LBS) and emergency services in cellular networks. Some location tracking techniques are based on passive monitoring of network events generated by the wireless terminals. Other techniques are active, i.e., proactively request the network or the terminal to provide location information.

SUMMARY OF THE DISCLOSURE

An embodiment that is described herein provides a method, including:
specifying a periodic time scale having a cycle period;
accumulating a plurality of data points, which indicate respective locations of a wireless communication terminal that were detected at respective measurement times; and
computing, based on the accumulated data points, a location profile indicating characteristic locations of the wireless communication terminal as a function of time over the cycle period.

In some embodiments, computing the location profile includes identifying, using the location profile, working and leisure hours of a user of the wireless communication terminal within the cycle period. Additionally or alternatively, computing the location profile includes identifying, using the location profile, a time interval within the cycle period in which the wireless communication terminal is in motion. Further additionally or alternatively, computing the location profile includes identifying, using the location profile, a characteristic traveling route of a user of the wireless communication terminal.

In an embodiment, the method includes combining multiple data points that correspond to a given measurement time within the cycle period, so as to improve a location accuracy of the wireless communication terminal at the given measurement time. In a disclosed embodiment, the multiple data points are characterized by respective error regions, and combining the multiple data points includes identifying a region in which at least some of the error regions overlap. In another embodiment, combining the multiple data points includes calculating an average of at least some of the locations indicated by the respective multiple data points. Averaging the locations may include detecting that one or more of the locations deviate from a characteristic location pertaining to the given measurement time within the cycle period, and omitting the one or more deviating locations from the average.

In another embodiment, the method includes identifying a subset of the data points that do not match the location profile, and computing an alternative location profile of the wireless communication terminal using the data points in the subset. In yet another embodiment, accumulating the data points includes grouping the data points based on the respective measurement times relative to the cycle period. In still another embodiment, accumulating the data points includes accepting the data points from a wireless communication network with which the wireless communication terminal communicates. The cycle period may include one of a day, a working weekday, a weekend day, a month and a year.

In an embodiment, accumulating the data points includes accumulating multiple sets of the data points pertaining to respective multiple wireless communication terminals, computing the location profile includes computing respective location profiles of the multiple terminals based on the respective sets of the data points, and defining the triggering condition includes defining the condition based on at least two of the location profiles.

In a disclosed embodiment, the method includes defining a triggering condition based on the location profile, and invoking an action with respect to the wireless communication terminal responsively to detecting a violation of the triggering condition. Invoking the action may include issuing an alert.

There is also provided, in accordance with an embodiment that is described herein, apparatus, including:
an interface, which is operative to accept a plurality of data points, which indicate respective locations of a wireless communication terminal that were detected at respective measurement times; and
a processor, which is coupled to specify a periodic time scale having a cycle period and to compute, based on the data points, a location profile indicating characteristic locations of the wireless communication terminal as a function of time over the cycle period.

The present disclosure will be more fully understood from the following detailed description of the embodiments thereof, taken together with the drawings in which:

Figure 1:
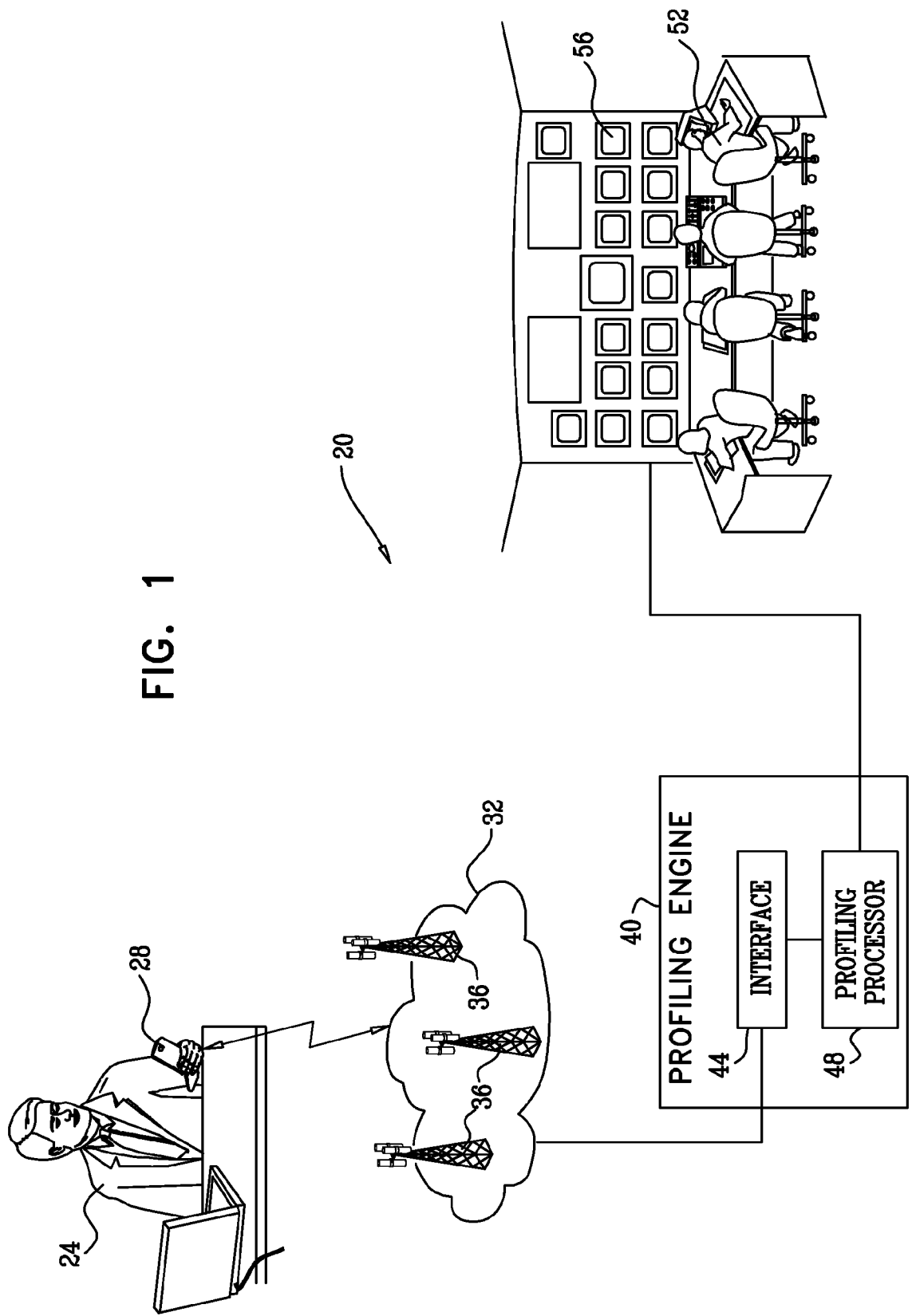
FIG. 1 is a schematic, pictorial illustration of a system for location profiling, in accordance with an embodiment of the present disclosure.

DETAILED DESCRIPTION OF EMBODIMENTS
OVERVIEW

Many users of wireless communication terminals follow daily, weekly or monthly routines, which are reflected in their geographical locations. For example, a given user may spend the working hours of each workday at a certain location, spend the night at another location, and travel between the two locations at approximately the same time and along similar routes each day. As such, the geographical location of this user exhibits a repetitive, periodic pattern. Embodiments that are described herein provide methods and systems for profiling the characteristic locations of users of wireless communication terminals, and for using these location profiles in a variety of applications. The tracked users and the wireless terminals they operate are referred to herein as targets.

In some embodiments, a profiling engine comprises a profiling processor, which accepts multiple data points regarding a given target. Each data point typically indicates a location measurement of the target, which was measured at a certain measurement time by a wireless communication system with which the target communicates. The processor accumulates the data points relative to a periodic time scale having a pre-specified time period. For example, the processor may accumulate the data points of the given target per each time-of-day (e.g., same hour) over multiple working days. In other words, the location measurements conducted at a certain time-of-day (e.g., 10 AM each day) are collected over multiple working days and grouped together. The accumulation process produces a location profile of the target, which indicates the characteristic geographical location of the target as a function of time, over the specified cycle period. Several examples of location profiles having different cycle periods are described and demonstrated herein.

The location profiles convey valuable information regarding the tracked targets, and can be used by the profiling engine in a variety of ways. For example, the profiling engine may use the location profile to improve the location accuracy of a target terminal that is idle for long period of time, to detect deviations from the characteristic location pattern of a target, to detect that a certain sensitive location is being visited regularly by a given target, and/or to identify connections among different targets by detecting similarities or correlations between their location profiles. The profile can also be used to identify characteristic behavior of a target, such as to determine the target's working and leisure hours or to identify the target's typical traveling routes.

Typically, each data point (location measurement) of a given target has a finite accuracy, which can be expressed as a circle having a given radius around the measured location. The location profiling methods described herein improve the accuracy of measuring the target's location by considering the overlap between multiple measurement circles. When computing the location profile, the profiling processor typically omits data points that deviate from the expected repetitive behavior of the target. For example, the profiling processor may calculate the average location pertaining to a certain time-of-day, determine and omit data points that deviate considerably from this average, and then re-calculate the average location excluding the omitted data points.

In some embodiments, the profiling processor predefines a certain triggering condition with respect to the location profile, and invokes appropriate action upon detecting a violation of the condition. For example, the processor may issue an alert to an operator of a monitoring center.

In summary, the methods and systems described herein study the periodic, repetitive patterns of the locations of targets, and then model these patterns by characteristic profiles. When using the disclosed methods and systems, targets can be tracked with high accuracy, and scenarios requiring attention can be detected and acted upon with high precision and reliability.

System Description

FIG. 1 is a schematic, pictorial illustration of a system 20 for location profiling, in accordance with an embodiment of the present disclosure. In system 20, users 24 operate wireless communication terminals 28 so as to communicate with a wireless communication network 32. Terminals 28 typically communicate with base stations 36 in network 32. Terminals 28 may comprise, for example, cellular phones, wireless-enabled Personal Digital Assistants (PDA) or mobile computers, or any other suitable type of communication or computing terminal having wireless communication capabilities.

Network 32 may comprise any suitable wireless communication network. The network may comprise, for example, a cellular network operating in accordance with any suitable cellular standard or protocol, such as a Universal Mobile Telecommunication System (UMTS) network, CDMA2000 network or other third generation (3G) cellular network, a Global System for Mobile communication (GSM) network or an Integrated Digital Enhanced Network (IDEN) network. Alternatively, network 32 may comprise a WiMAX network operating in accordance with the IEEE 802.16 standards or other wireless data network.

Network 32 tracks the locations of some or all of terminals 28, and produces location information indicating the locations of the tracked terminals. Various techniques for tracking the locations of wireless communication terminals are known in the art, and network 32 may employ any suitable technique for this purpose.

Some location tracking techniques, referred to as network-based techniques, are carried out by the base stations and other network-side components of network 32, without necessarily using special hardware or software at the mobile terminal side. For example, Cell Identification (CID) techniques, also sometimes referred to as Cell Global Identity (CGI) techniques, locate the user by identifying the cell via which the user currently communicates. Enhanced CID (E-CID, also referred to as E-CGI) techniques combine CID information with timing information, which is indicative of the distance between the user and the base station. In UMTS networks, for example, the timing information may comprise Round-Trip Time (RTT) values. In GSM applications, timing information may comprise Time Advance (TA) values.

Another network-based location technique, called Uplink Time Difference of Arrival (U-TDOA), determines the user position by comparing and calculating the difference in time required for a user transmission to reach different base station sites. The arrival time measurements are made by Location Measurement Units (LMUs) installed at selected base station sites. Yet another technique, referred to as Angle of Arrival (AOA), determines the user position by establishing lines of bearing from base station sites to the user.

Other location tracking techniques are terminal-based, i.e., use special hardware or software in the mobile terminal. For example, some techniques use measurements performed by a Global Positioning System (GPS) receiver installed in the communication terminal. In Assisted GPS (A-GPS) techniques, the GPS measurements are assisted by an assistance server external to the mobile terminal. The assistance server is sometimes equipped with another GPS receiver, whose position is known a-priori. Another terminal-based technique is Enhanced Observed Time Difference (E-OTD), in which the terminal measures the time differences between signal arrivals from different base stations. A similar terminal-based technique is called Enhanced Forward Link Trilateration (EFLT).

The location tracking techniques deployed in network 32 may be passive or active. Passive techniques perform unobtrusive probing of the signaling information transmitted in the network, and extract location information from the monitored signaling. Active techniques, on the other hand, proactively request the network or the terminal to provide location information.

System 20 comprises a profiling engine 40, which uses the location information produced by network 32 to compute characteristic location profiles of some or all of terminals 28. The tracked users are referred to herein as targets. (The purpose of tracking the locations of terminals 28 is usually to locate users 24. Therefore, the terms "tracking the terminals"

and "tracking the users" are sometimes used interchangeably herein. Users are also referred to sometimes as targets.) The location profile of a given target represents the target's typical location as a function of time, over a given time frame (e.g., a day or a month). The location profiles produced by the profiling engine, as well as several possible uses of these profiles, are described and demonstrated further below.

Profiling engine 40 may be operated, for example, by a government or law enforcement agency for tracking the locations of individuals under surveillance. Alternatively, location profiles can be used for providing Location-Based Services (LBS) to mobile terminal users. For example, location profiling of mobile subscribers can be used to enhance the accuracy of location-based advertizing schemes. As another example, location profiling can be used in fraud prevention applications, such as by comparing a subscriber's billing address with the actual measured location of the subscriber using leisure (non-working) hours.

Profiling engine 40 comprises an interface 44 for communicating with network 32, and a profiling processor 48, which carries out the profiling methods described herein. In the embodiment of FIG. 1, the profiling engine is connected to a monitoring center. In this embodiment, the location profiles, as well as other information that is addressed below, are typically presented to an operator 52 of the monitoring center, such as using a display 56 or other suitable output device. In alternative embodiments, the profiling engine may provide the location profiles to any other suitable system, such as various investigative or analytics systems. The operation of such systems may be real-time (e.g., real-time tracking of target locations and related events) or off-line (e.g., off-line analysis of target behavior).

Typically, processor 48 comprises a general-purpose computer, which is programmed in software to carry out the functions described herein. The software may be downloaded to the computer in electronic form, over a network, for example, or it may, alternatively or additionally, be provided and/or stored on tangible media, such as magnetic, optical, or electronic memory. In some embodiments, the functions of profiling processor 48 are integrated with other functions of the monitoring center on one or more computing platforms.

The embodiment of FIG. 1 refers to a single communication network 32, for the sake of clarity. In alternative embodiments, however, profiling engine 40 may accept location information from multiple wireless networks. The profiling engine may accept location information for a given target from multiple networks, such as when the target operates a multi-mode terminal or multiple terminals in different networks. Although FIG. 1 shows a single user and a single terminal, profiling engine 40 typically produces location profiles for multiple targets. The profiling engine may produce profiles selectively for a pre-specified set of targets, or for any user whose location is measured by network 32.

Target Location Profiles

The geographical location of a given target often exhibits a repetitive, periodic behavior as a function of time. For example, a given target may spend the night at a certain location, spend the working hours of the day at another location, and move between the two locations along a certain route at similar times every day. This characteristic behavior typically repeats itself, with some variations, during the working days of the week. The target's location pattern during weekends may differ from the weekday location pattern. However, the target will often have a similar location pattern in different weekends.

The target's location may exhibit repetitive patterns having different cycle periods. For example, the target described above may spend the first week of every month travelling to another city, and the remaining days of the month in his home town. The time period over which the target's location exhibits similar patterns is referred to herein as a cycle period. The cycle period may thus comprise a day, a month, a year, or any other suitable period.

Figure 2:
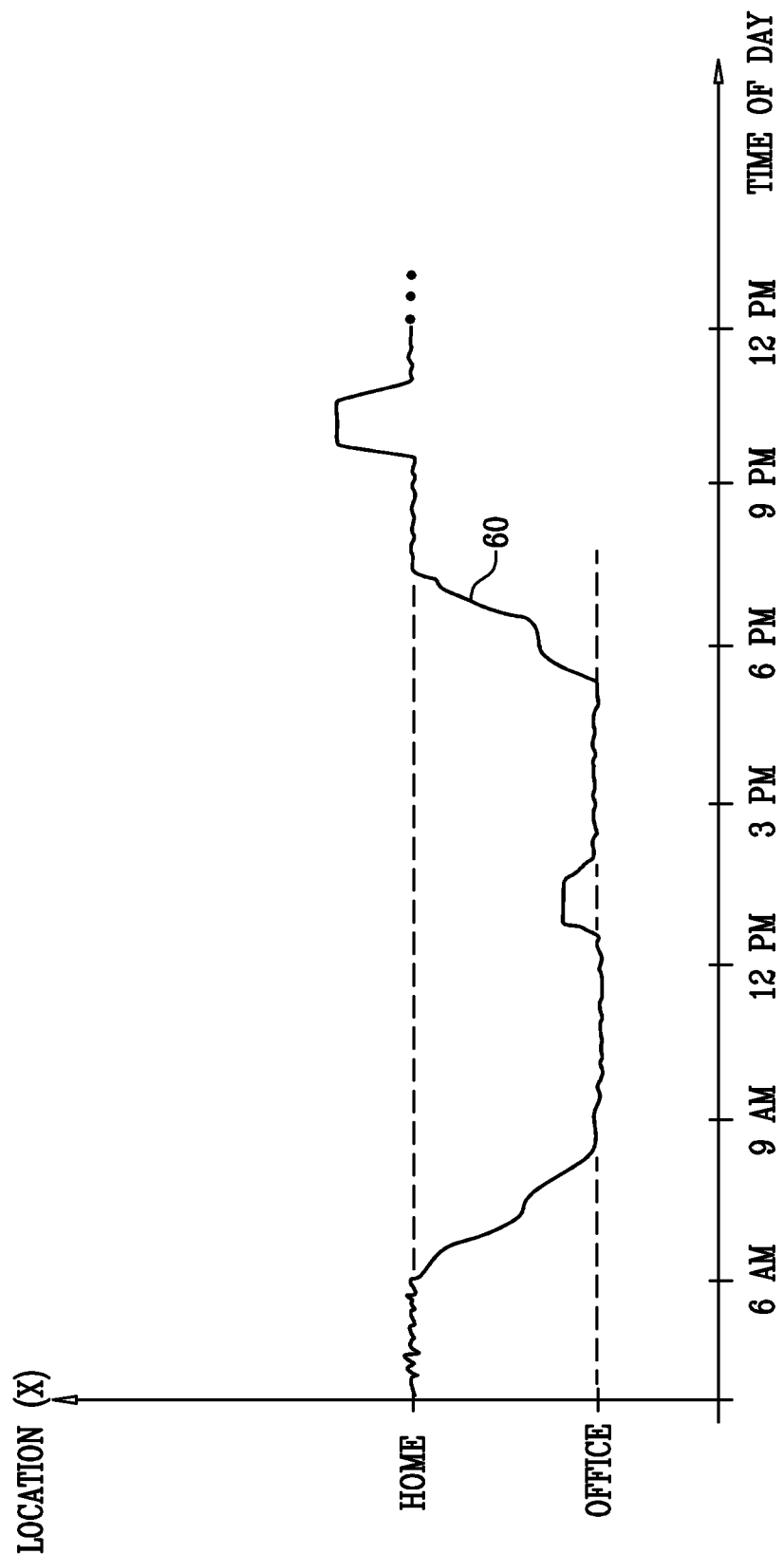
FIG. 2 is a graph showing a location profile, in accordance with an embodiment of the present disclosure.

FIG. 2 is a graph showing an example location profile of a given target, in accordance with an embodiment of the present disclosure. In the present example, the cycle period comprises 24-hour period that includes a working day. In FIG. 2, a curve 60 shows the characteristic location of the target along the 24-hour cycle period. As can be seen in the figure, the target has characteristic "HOME" and "OFFICE" locations (which may or may not be known in advance). The target spends the night hours, up to approximately 6 AM, at home. Between approximately 6 AM and 8:30 AM the target commutes to the office, where he is located until approximately 5:30 PM (with a short lunch break at a nearby restaurant between 12:30 and 1:15 PM). Between approximately 5:30 and 7 PM the target travels home from work. Between 10 PM and 11 PM he is located at another location that repeats itself characteristically during weekdays.

Thus, curve 60 illustrates the characteristic location pattern of the target during weekdays. Processor 48 typically produces the profile by accumulating a large number of location measurements of the target, measured over multiple days.

FIG. 2 shows a single location coordinate for the sake of clarity. A typical location profile, however, specifies the target's location as a function of time using two (and sometimes three) location coordinates. Typically, processor 48 produces and maintains at least one location profile per target. A given target may have multiple profiles, such as profiles defined over different cycle periods (e.g., a 24-hour profile and a monthly profile of the same target). A given target may also have multiple profiles having the same cycle period, such as separate 24-hour profiles specifying weekday and weekend behavior.

The location profiles produced by processor 48 convey valuable information regarding the targets, and can be used by the profiling engine in various ways. In some embodiments, the processor predefines a certain triggering condition with respect to the location profile, and invokes appropriate action upon detecting that the condition is violated. For example, processor 48 may detect that a given terminal 28 is idle for longer than a predefined period of time. The processor may detect that network 32 provides location information regarding this target at irregular intervals and with large gaps. If a location profile is available for this target, processor 48 can use the profile to fill these gaps and calculate the estimated location of the target at any desired time based on the characteristic location pattern.

The profiling engine can also use the location profile to detect deviations from the characteristic location pattern of the target. Such deviations can be detected, for example, by applying trend analysis techniques, as are well-known in the art. If a target is found to deviate considerably from its characteristic location profile (e.g., deviate from its expected locations or routes), the monitoring center may invoke appropriate action, such as issue an alert or request that the target be tracked with higher priority or accuracy.

As another example, the profiling engine may detect a situation in which a given target begins to exhibit a repetitive behavior that is different from the repetitive behavior known so far. Such a scenario may occur, for example, when the target changed his or her working place or moved to live at a different location. In some embodiments, the profiling engine aggregates data points that do not match the currently-known profile. The profiling engine may attempt to detect repetitive patterns within these non-matching data points, and gradually compute an alternative location profile for the same target.

As yet another example, the profiling engine may use the location profile to detect newly-activated terminals by determining that these targets do not yet have a valid location profile. Additionally or alternatively, the profiling engine may detect terminals that have been switched off for a long period of time, such as by determining the last time at which the location profile has been updated. The profiling engine may trigger an alert or notify operator 52 upon detecting such a terminal. The profiling engine may also identify, using the profile, that a certain sensitive location is being visited regularly by a given target, and trigger an alert or notification accordingly.

In some embodiments, processor 48 may specify conditions and invoke actions based on multiple location profiles of multiple terminals 28. For example, processor 48 may identify similarities or correlations between the location profiles of different targets and invoke action based on these similarities. Correlations between location profiles may be indicative of relationships between different targets. For example, if two targets frequently visit a given location at the same times, this behavior may indicate a connection between them.

Further alternatively, the profiling engine may specify and monitor any other suitable condition and invoke any other suitable action based on the location profiles. Additional example applications of the location profiles are described further below.

Location Profiling Method Description

Figure 3:
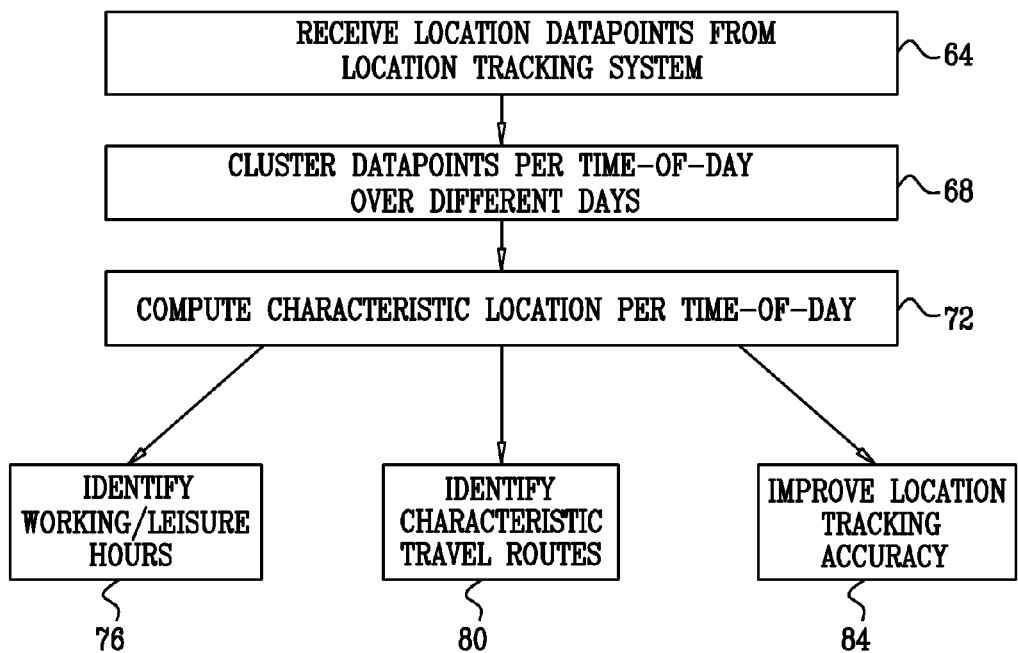
FIG. 3 is a flow chart that schematically illustrates a method for location profiling, in accordance with an embodiment of the present disclosure.

FIG. 3 is a flow chart that schematically illustrates a method for location profiling, in accordance with an embodiment of the present disclosure. The method begins with profiling processor 48 of profiling engine 40 accepting location information from network 32, at an input step 64. The location information is regarded by processor 48 as a large collection of data points. Each data point comprises (1) an identifier indicating the identity of the target, (2) a measured location (e.g., location coordinates) and (3) the time at which the target's location was measured. Typically, each data point comprises a measure of the error, or accuracy, which is associated with the location measurement. The error measure is usually expressed in terms of a geometrical region in which the target is likely to be located. The error measure can be expressed, for example, in terms of an error radius around the reported coordinate, often on the order of several tens or hundreds of meters. In other cases, the error measure may take non-circular shapes. For example, when the target location is measured using a combination of Cell ID (CID) and Time Advance (TA) information, the error measure is often banana-shaped. In other measurement techniques the error measure may have the shape of a polygon, or any other suitable shape.

In order to produce a location profile of a given target, processor 48 specifies a certain periodic time scale having a cycle period. In a typical application, the cycle period comprises a week, with different profiles for the working hours of work days, night hours of work days, as well as weekends. In some embodiments, processor 48 marks (and possibly ignores) special days such as holidays and vacations.

The processor (or operator 52) selects a cycle period over which the target's location is expected to exhibit a characteristic pattern that will recur in subsequent cycle periods. For example, the cycle period may comprise a day (a 24-hour period), a week or a month. In the example of FIG. 2 above, the cycle period comprises a 24-hour period. In other words, processor 48 computes a location profile that represents the characteristic location of the target over a 24-hour period.

Processor 48 accumulates data points that are related to the given target, at an accumulation step 68. The processor accumulates the data points according to their relative time within the cycle period. In the present example, the processor accumulates data points from different days in accordance with their time-of-day. For example, data points of the target that were measured at 6 AM on different days are accumulated together. Data points measured at 6:30 AM on different days are also accumulated together, and so on.

In some embodiments, processor 48 calculates one or more statistical measures (e.g., mean or variance) of the data points associated with each relative time within the cycle period. In the present example, the processor may compute the average location of the target over each 30-minute interval within the 24-hour cycle period. The statistical measures are chosen so as to provide sufficient information for detecting the desired events and invoking the desired actions, such as in the applications described above.

Typically, processor 48 identifies and discards data points that deviate considerably from the repetitive baseline pattern of the target. Consider, for example, a target who regularly works in city A, but at some point in time attends a conference in city B for a week. In some embodiments, processor 48 identifies the location measurements at city B as deviating from the normal repetitive pattern of the target, and discards these measurements. Without this feature, the location profile may be distorted by singular events that are not part of the normal behavior pattern of the target. In some embodiments, processor 48 discards such singular events by (1) calculating an initial average location for a given time within the cycle period, (2) identifying data points that deviate considerably from the average, and (3) re-calculate the average while excluding the identified deviating data points.

Processor 48 computes a location profile of the target based on the accumulated data points, at a profile computation step 72. The profile typically gives the characteristic location of the target (in two or three dimensions) as a function of time within the cycle period. For example, the value of the profile at a given time within the cycle period may comprise the mean of the accumulated data points corresponding to this time. (In the example of FIG. 2, the value of the profile at a certain time-of-day may comprise the mean location of the target at this time-of-day, calculated over multiple different working days.) The profile may also specify a confidence level (e.g., a variance of the location) for each time within the cycle period.

Processor 48 may use the location profile for various purposes. Several example applications have been described above. Additionally or alternatively, the processor may use the profile to identify the typical working hours and leisure hours of the target, at a working/leisure identification step 76. Additionally or alternatively, the processor may identify characteristic travel routes used by the target, at a route identification step 80. The processor may detect that the target is typically in motion at a certain time within the cycle period, e.g., based on the rate-of-change (e.g., slope or gradient) of the profile. The processor may differentiate between different travel modes (target traveling in a vehicle or walking), and also determine the characteristic travel routes, using the profile.

In some embodiments, the processor divides the profile into intervals based on the classification to working time, leisure time and travel time. For example, the processor may initially test several possible hypotheses as to the start and end times of the target's working and leisure hours. In a typical process, the processor attempts to find the longest intervals in which the target's location is relatively constant. Having identified the working and leisure hours, intermediate intervals in which the target is in motion are classified as travel times.

Using the Location Profile to Improve Location Accuracy

In some embodiments, processor 48 uses the location profile to improve the accuracy of measuring the target's location, at an accuracy enhancement step 84. This feature is especially important when the target's location is measured by passive probing, a process whose accuracy is often rough. The processor can enhance the location accuracy by combining (e.g., averaging) multiple location measurements that pertain to a certain time within the cycle period. Multiple data points can also be combined by considering the overlap between their error regions. This feature is addressed in greater detail in FIG. 4 below.

For example, consider a situation in which the target communicates via two or more different base stations 36 when at work. Processor 48 may identify that network 32 provides location measurements of the target from multiple base stations during the target's working hours. In this scenario, assuming the coverage areas of these base stations are known, processor 48 can intersect (or otherwise process) the coverage areas of the base stations, so as to pinpoint the target's location with improved accuracy. Note that the location measurements from the different base stations may have been acquired on different days.

Figure 4:
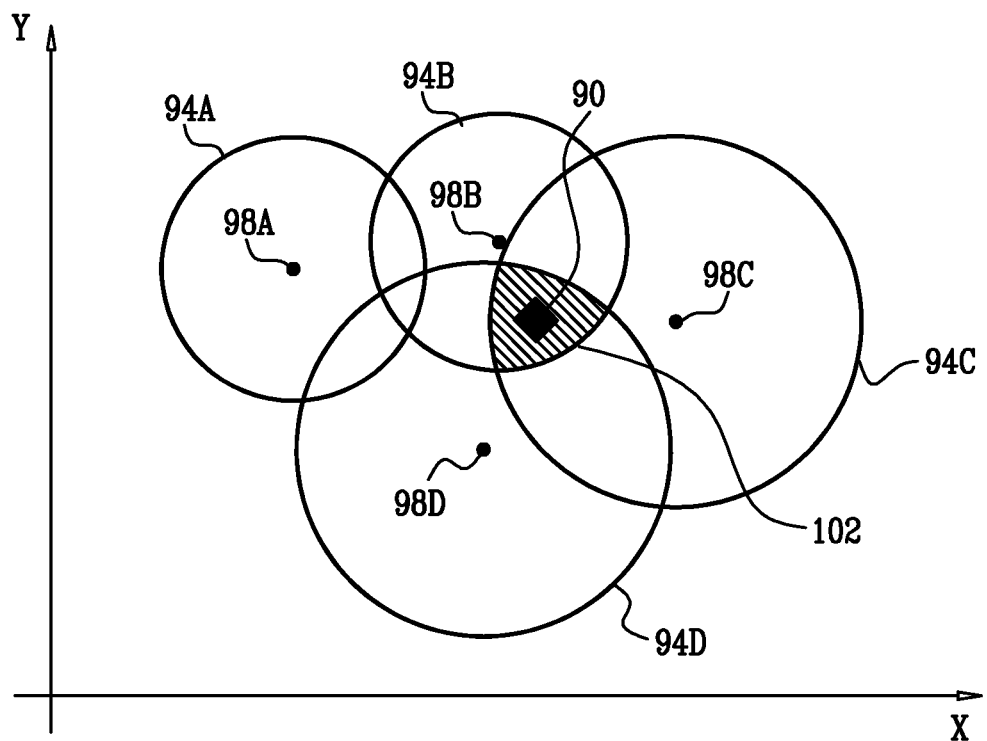
FIG. 4 is a diagram that schematically illustrates multiple location measurements that are used in producing a location profile, in accordance with an embodiment of the present disclosure.

FIG. 4 is a diagram that schematically illustrates multiple location measurements that are used in producing a location profile, in accordance with an embodiment of the present disclosure. In FIG. 4, the actual location of the target at a given time within the repetitive cycle (e.g., the target's work location) is indicated by a point 90. Four location measurements of the target, which were acquired by network 32 at the given time within the profile, are shown in the figure. These location measurements may have been taken, for example, at the same time-of-day in different days.

The four location measurements are represented by respective center coordinates 98A . . . 98D, and error circles 94A . . . 94D. In the present example, coordinates 98A and 98B were measured by a high accuracy technique, and therefore circles 94A and 94B are relatively small. Coordinates 98C and 98D, on the other hand, were measured by a lower accuracy (e.g., passive) technique, and therefore circles 94C and 94D are larger.

As can be seen in the figure, circles 94B, 94C and 94D have an overlap region 102. Circle 94A, on the other hand, has no overlap with region 102. In some embodiments, processor 48 identifies overlap region 102 and declares it as the estimated location of the target. As can be appreciated, region 102 is considerably smaller than any of the error circles. Thus, by considering the overlap between different data points taken at a certain time within the profile, processor 48 is able to considerably improve the location accuracy of the target.

Note that circles 94A, 94B and 94D also have a mutual overlap region, but this region does not reflect the true location of the target. In some embodiments, processor 48 selects one of several possible overlap regions based on any suitable criteria, such as the number of data points that overlap in a given region, or the confidence levels associated with the different overlapping measurements.

In some embodiments, processor 48 automatically identifies changes in the presence or identities of targets. For example, new targets may join the network and existing targets may depart the network or terminate service. As another example, users may have multiple identities that may change over time. Processor 48 typically tracks these changes automatically, so as to maintain a single record per target.

Although the embodiments described herein mainly address computation of location profiles of mobile network users for alerting purposes, the principles of the present disclosure can also be used for other applications, such as location-based services, fraud prevention applications and border control systems.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
specifying a periodic time scale having a cycle period;
accumulating a plurality of data points, which indicate respective locations of a wireless communication terminal that were detected at respective measurement times;
computing, based on the accumulated data points, a location profile indicating characteristic locations of the wireless communication terminal as a function of time over the cycle period;
combining multiple data points that correspond to a given measurement time within the cycle period, wherein the multiple data points are characterized by respective error regions associated with each given measurement time, and wherein combining the multiple data points comprises identifying a region in which at least some of the error regions overlap as the estimated location of the wireless communication terminal;
defining a triggering condition based on the location profile; and
invoking an action with respect to the wireless communication terminal responsively to detecting a violation of the triggering condition.

2. The method according to claim 1, wherein computing the location profile comprises identifying, using the location profile, working and leisure hours of a user of the wireless communication terminal within the cycle period.

3. The method according to claim 1, wherein computing the location profile comprises identifying, using the location profile, a time interval within the cycle period in which the wireless communication terminal is in motion.

4. The method according to claim 1, wherein computing the location profile comprises identifying, using the location profile, a characteristic traveling route of a user of the wireless communication terminal.

5. The method according to claim 1, wherein combining the multiple data points comprises calculating an average of at least some of the locations indicated by the respective multiple data points.

6. The method according to claim 1, and comprising identifying a subset of the data points that do not match the location profile, and computing an alternative location profile of the wireless communication terminal using the data points in the subset.

7. The method according to claim 1, wherein accumulating the data points comprises grouping the data points based on the respective measurement times relative to the cycle period.

8. The method according to claim 1, wherein the cycle period comprises one of a day, a working weekday, a weekend day, a month and a year.

9. The method according to claim 1, wherein accumulating the data points comprises accumulating multiple sets of the data points pertaining to respective multiple wireless communication terminals, wherein computing the location profile comprises computing respective location profiles of the multiple terminals based on the respective sets of the data points, and wherein defining the triggering condition comprises defining the condition based on at least two of the location profiles.

10. Apparatus, comprising:
- an interface, which is operative to accept a plurality of data points, which indicate respective locations of a wireless communication terminal that were detected at respective measurement times; and
- a processor, which is coupled to specify a periodic time scale having a cycle period and to compute, based on the data points, a location profile indicating characteristic locations of the wireless communication terminal as a function of time over the cycle period,
- wherein the processor is coupled to combine multiple data points that correspond to a given measurement time within the cycle period,
- wherein the multiple data points are characterized by respective error regions associated with each given measurement time, and wherein the processor is coupled to combine the multiple data points by identifying a region in which at least some of the error regions overlap as the estimated location of the wireless communication terminal,
- wherein the processor defines a triggering condition based on the location profile, and
- wherein the processor invokes an action with respect to the wireless communication terminal responsively to detecting a violation of the triggering condition.

11. The apparatus according to claim 10, wherein the processor is coupled to identify, using the location profile, working and leisure hours of a user of the wireless communication terminal within the cycle period.

12. The apparatus according to claim 10, wherein the processor is coupled to identify, using the location profile, a time interval within the cycle period in which the wireless communication terminal is in motion.

13. The apparatus according to claim 10, wherein the processor is coupled to identify, using the location profile, a characteristic traveling route of a user of the wireless communication terminal.

14. The apparatus according to claim 10, wherein the processor is coupled to combine the multiple data points by calculating an average of at least some of the locations indicated by the respective multiple data points.

* * * * *